UNITED STATES PATENT OFFICE.

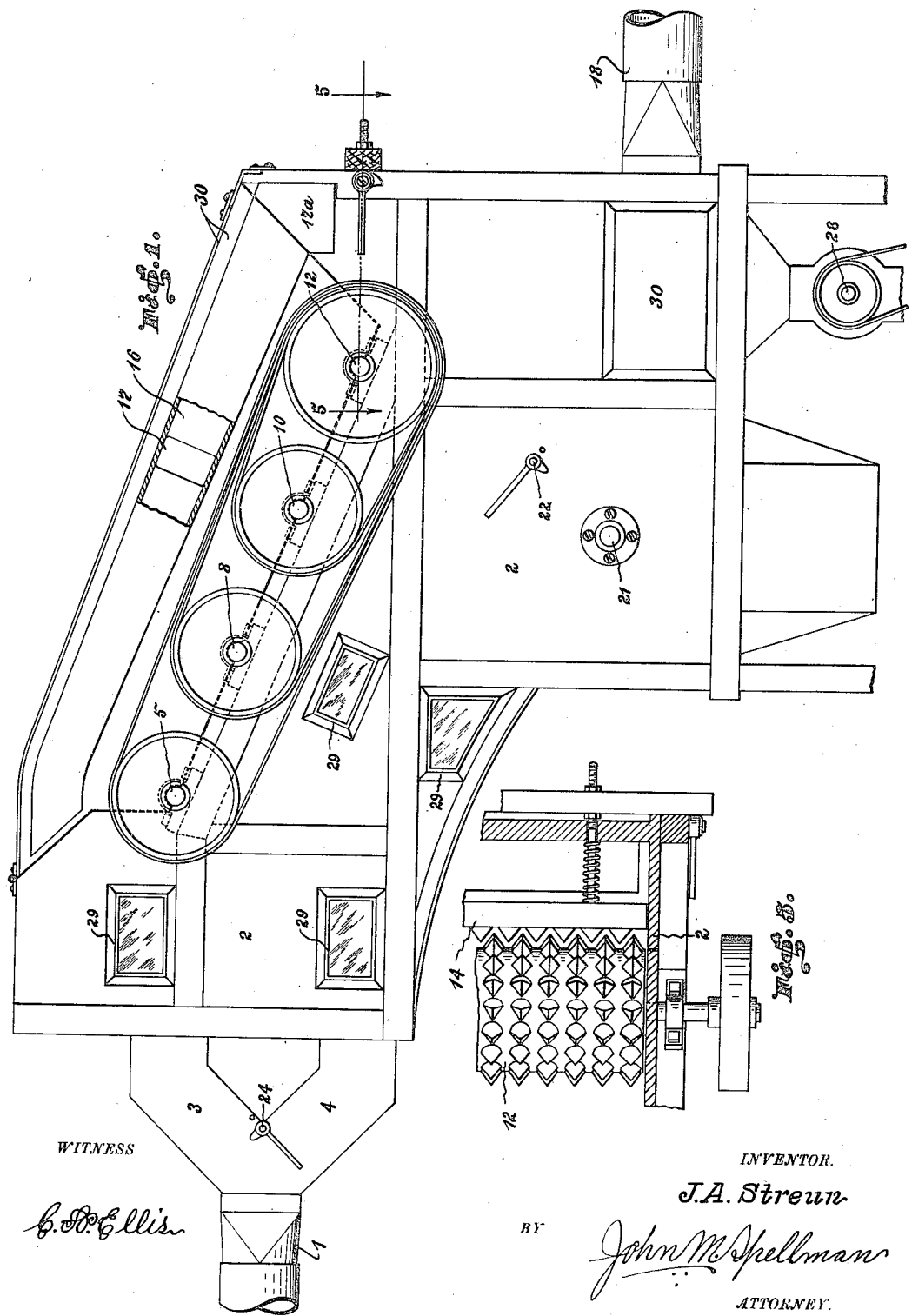

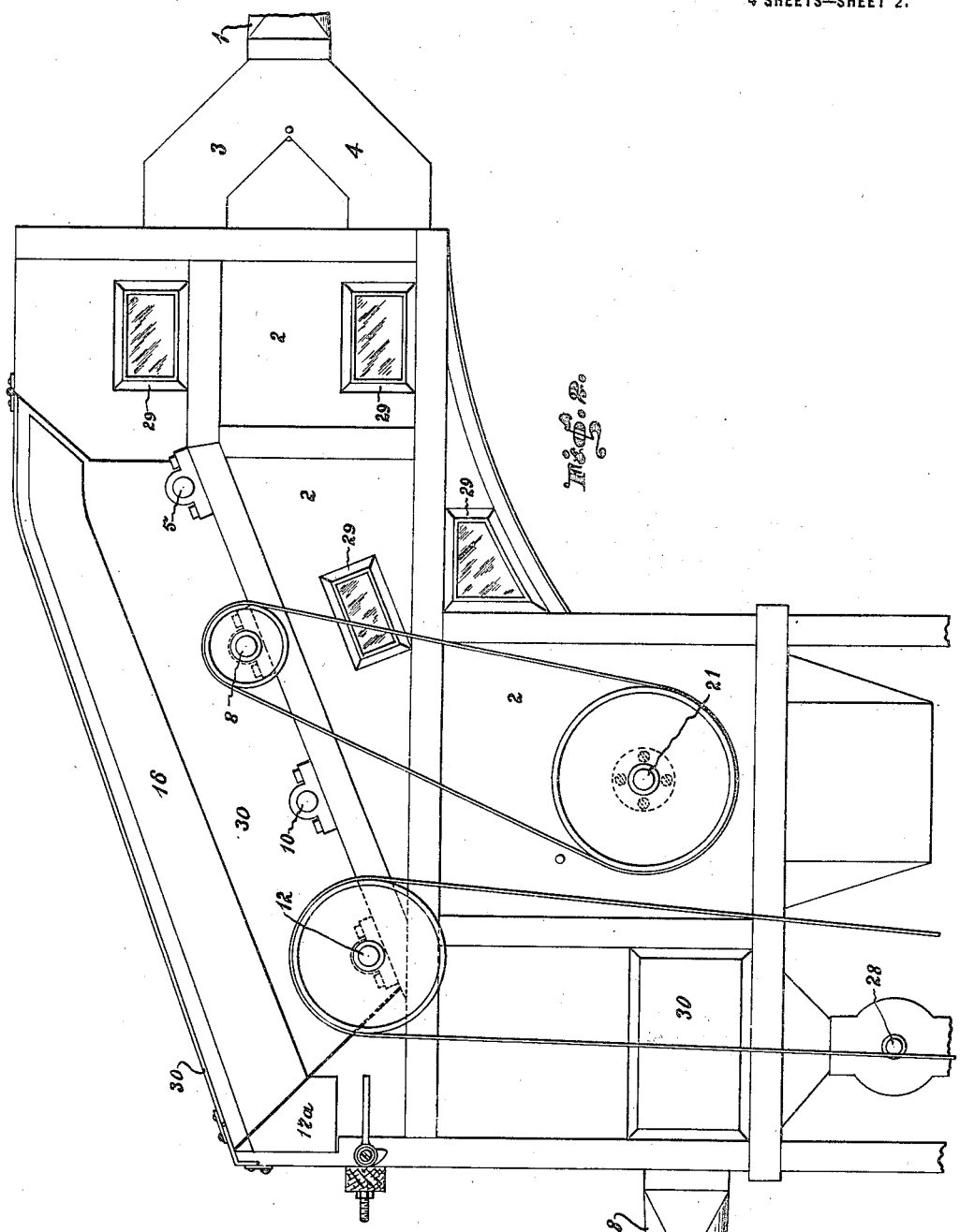

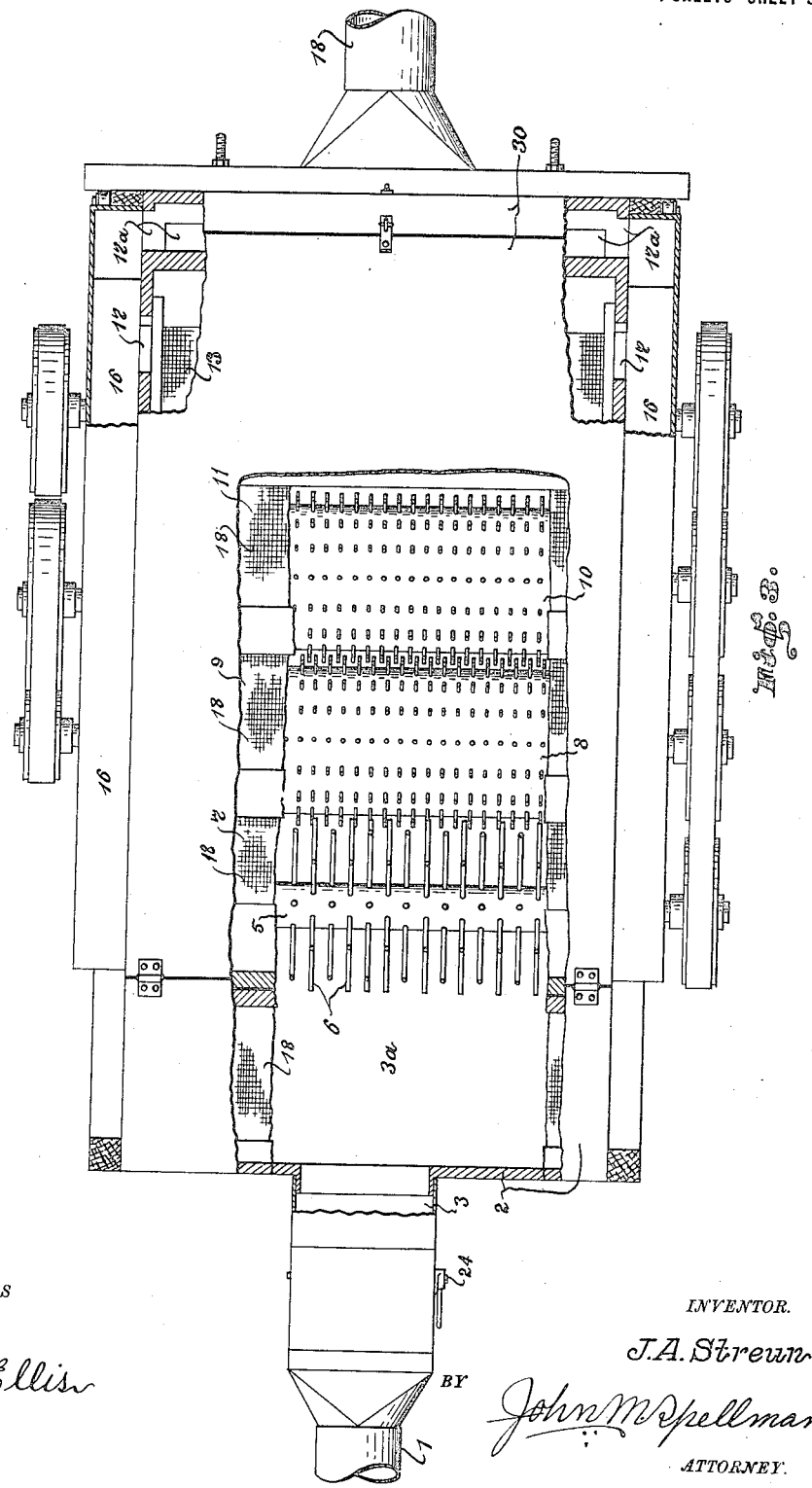

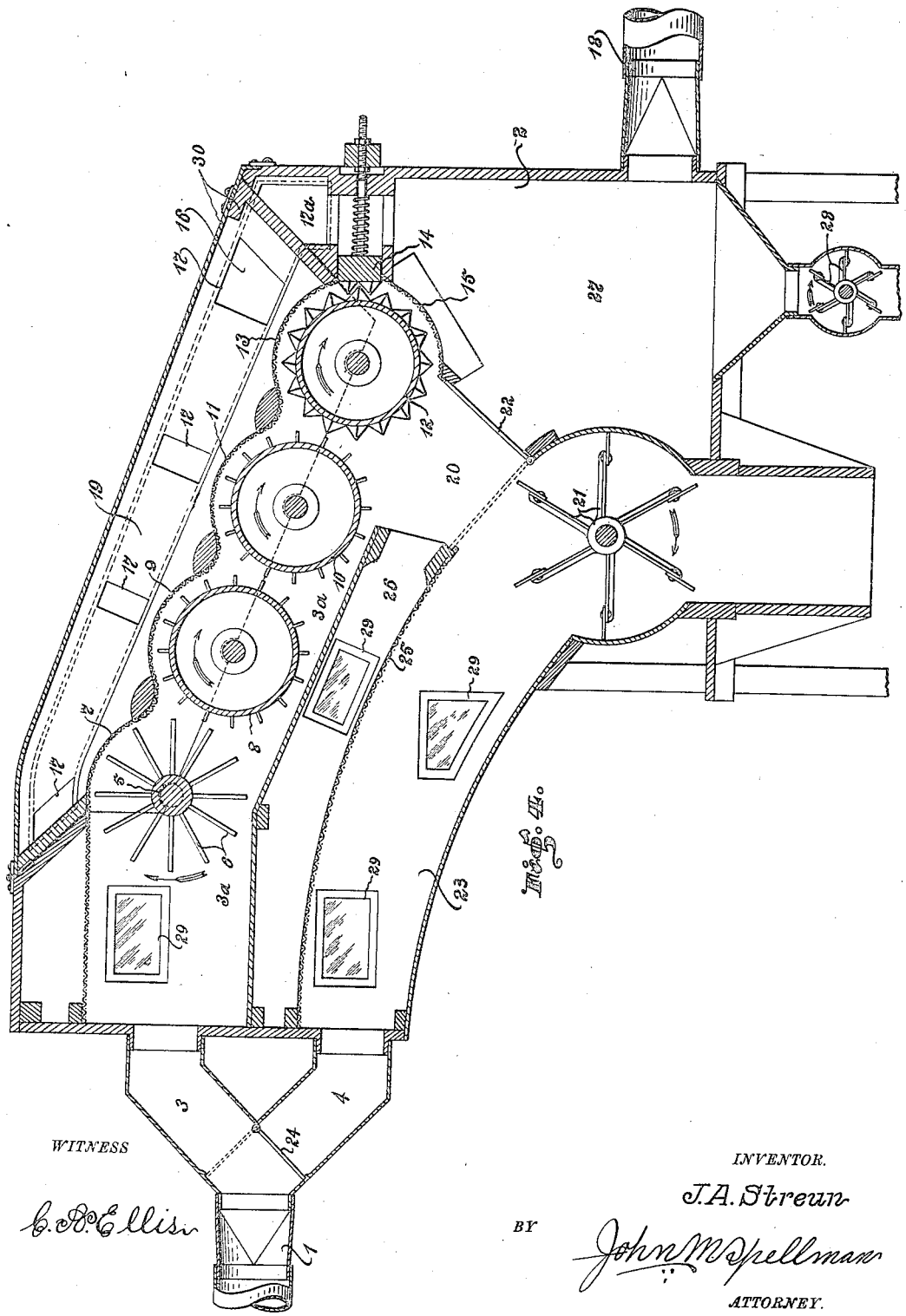

JOHN ARNOLD STREUN, OF BOWIE, TEXAS.

BOLL BREAKER AND CLEANER.

1,256,743.  Specification of Letters Patent.  Patented Feb. 19, 1918.

Application filed June 12, 1916. Serial No. 103,119.

*To all whom it may concern:*

Be it known that I, JOHN A. STREUN, a citizen of the United States, residing at Bowie, in the county of Montague and State of Texas, have invented certain new and useful Improvements in Boll Breakers and Cleaners, of which the following is a specification.

My invention has relation to an improvement in cotton cleaner and boll crushers, and in such connection it relates more particularly to an arrangement and construction of parts constituting a machine or apparatus which may be directly attached to and supported by the standard gin now in use.

My invention embodies a machine or apparatus comprising a housing constructed for ready attachment to or support by a gin to which cotton under suction or air pressure may be delivered and in which certain cleaning instrumentalities and boll crushing means are inclosed. The instrumentalities and means are arranged in step by step downward relationship with each other and all coöperatively with a concave screen arranged above an instrumentality or means and below a chamber under suction. The housing is provided with an inlet having two entrances controlled by a valve or damper by means of which the cotton may be sent through the cleaning and boll crushing mechanisms or may be sent through the housing direct to the gin without passing through said mechanisms.

In the carrying out of my invention there is provided within a housing and below a series of concave screens, first a spreading and beating roll or cylinder, coöperating with one of the screens, and second a pair of picker rolls each operating successively upon the cotton after it leaves the beating mechanism and each picker roll coöperating with a concave screen, and third, a boll crushing roll operating upon the cotton after it leaves the picker rolls and coöperating with a screen and also, when required, with an adjustable breast and an additional screen covering the discharge surface of the boll crushing roll.

There is also provided within the housing above the screens a chamber from which air is drawn to constitute a suction chamber to draw dirt from the cotton through said screens and an outlet from the boll crushing means controlled by a revolving vacuum feeder and leading to the gin stand.

In addition to these features of my improved apparatus or machine, the inlet to the housing is divided into two ducts controlled by a damper, one of said ducts leading the cotton to the spreading and beating roll and the other instrumentalities in series, and the other of said ducts leading to a chamber below said instrumentalities and discharging directly into the vacuum feeder.

The axes of the various instrumentalities are arranged in downwardly descending planes or in other words the plane passing through all the axes is downwardly inclined with respect to the horizontal plane of the apparatus.

The nature and scope of my invention will be more fully understood from the following description taken in connection with the accompanying drawings forming a part hereof, in which—

Figure 1, is a side elevational view of an apparatus embodying the main features of my invention;

Fig. 2, is a similar view of the other side of the apparatus;

Fig. 3, is a top or plan view with the cover partly broken away;

Fig. 4, is a longitudinal sectional view of the apparatus; and

Fig. 5, is a detail sectional view taken on the line 5—5 of Fig. 1.

Referring to the drawings 1, represents the inlet flue or passageway for cotton or cotton and bolls entering the housing 2 of the machine. The material may be forced through inlet 1 under pressure of air or under suction preferably within the housing 2 as hereinafter described. The cotton or cotton and bolls usually travels from inlet 1 through the upper of a pair of ducts 3, 4, and is discharged from this duct 3 directly to chamber 3ª in front of beating and spreading roll. This roll comprises a revolving cylinder or shaft 5 having radiating fingers 6 arranged in lines to form double spirals proceeding around the roll from the center or approximate center toward each end. The function of the beating and spreading fingers 6 is to fluff up the cotton and shift it endwise over a concave screen 7 arranged above the roll and coöperating therewith. The fingers 6 also serve to revolve the cotton and to present it to an adjacent picker roll 8. The picker roll 8 operates upon the cotton in conjunction with the concave screen 9 arranged above its periphery and transfers the cotton to an adjacent second picker roll 10 coöperating with a concave screen 11 arranged above the periphery of said picker roll 10. The second roll 10 finally transfers or feeds the cotton to a boll crushing roll 12 revolving below the concave screen 13 and adjacent to a breast 14. Below the breast 14, which is adjustable, is arranged a second screen 15 adjacent to and covering the discharge side of boll crushing roll 12.

Above screens 7, 9, 11 and 13 and within the housing 2 is arranged a chamber 19 connected by ports or openings 17 through duct 16 with a suction or vacuum creating apparatus not shown, connected to the pipe 18. Loose dirt in the cotton as it enters chamber 3ª and as it passes through the various instrumentalities is thus sucked through the respective screens to chambers 19 and 16.

Below the crushing roll 12 is arranged an outlet passageway 20 leading to a vacuum feeder 21 of the usual construction. In the passageway 20 is arranged a valve or damper 22 which when in position indicated by full lines directs the cotton to the feeder 21.

Below the instrumentalities above described is arranged a second chamber 23 to which the duct 4, from flue or inlet 1, leads. A valve or damper 24 at the junction of ducts 3 and 4 with inlet 1 serves to direct the cotton to either duct 3 or duct 4 as required. When the valve 24 is in the position indicated by full lines in Fig. 4, the cotton is directed through duct 3 and the various instrumentalities. But when turned to the position indicated by dotted lines, the valve or damper 24 directs the cotton through duct 4 into chamber 23. The roof of this chamber 23 is formed by a screen 25 and by the damper or valve 22 when said valve is in the position indicated by dotted lines in Fig. 4. The chamber 23 discharges upon the vacuum feeder 21 and above the screen 25 is arranged a vacuum chamber 26 serving to suck the loose dirt through the screen 25 as the cotton passes through said chamber 23.

The dirt drawn into chamber 26, and chambers 16 and 19 empties into the main suction chamber 27, the inlet from duct 16 being shown at 17ª, and falls by gravity into the vacuum feeder 28. The windows 29 removable lids 30 and other parts shown in the drawings are of well known construction and their purpose and use are well known in the art.

The axes of the various rolls 6, 8, 10 and 12 are arranged in a plane downwardly inclined with respect to the horizontal plane of the machine as clearly illustrated in the drawings.

Claims:

1. In an apparatus of the character described, a housing, a beating and spreading roll, picker roll mechanism, and a boll crushing roll all arranged within the housing to operate successively upon the material, the respective axes of revolution of the rolls and mechanism being arranged in a downwardly inclined plane, a series of concave screens, each arranged above and coöperating with a roll or mechanism and a suction chamber arranged within the housing and above said screens.

2. In an apparatus of the character described, a housing, a beating and spreading roll, its coöperating concave screen arranged above the roll, picker mechanism, concave screens arranged above and coöperating with the picker mechanism, a boll crushing mechanism, a concave screen arranged above the boll crushing mechanism, a concave screen arranged at the delivery side of said mechanism, and a means of creating suction outside all of said screens.

3. In an apparatus of the character described, a housing, an inlet, two ducts leading from the inlet, a valve controlling the entrance of the inlet to the respective ducts, a series of beating, spreading, picking and boll crushing instrumentalities arranged in a compartment of the housing to which one of said ducts discharges, a second compartment to which the other duct discharges, a common outlet and a vacuum feeder for both said compartments and a valve controlling the outlet to alternately confine said outlet to either of said compartments, in combination with means for creating suction outside each of said compartments.

In testimony whereof I have signed my name to this specification.

JNO. ARNOLD STREUN.